J. K. MACDONALD.
Security-Hooks.
No. 135,228.
Patented Jan. 28, 1873.
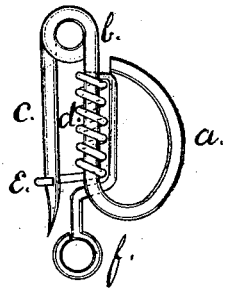
Witness
Horace Harris
Benj. H. Van Ness
Inventor.
J. K. Macdonald

UNITED STATES PATENT OFFICE.

JOHN K. MACDONALD, OF NEWARK, NEW JERSEY.

IMPROVEMENT IN SECURITY-HOOKS.

Specification forming part of Letters Patent No. 135,228, dated January 28, 1873.

*To all whom it may concern:*

Be it known that I, JOHN K. MACDONALD, of Newark, in the county of Essex and State of New Jersey, have invented a certain Mode of Manufacturing Security-Pins, of which the following is a specification:

The object of this invention is to make a cheap and convenient article to attach to a garment for receiving and holding a watch, or key, or eyeglass, or other article. The invention consists in bending a wire to form a hook, $a$, shank $b$, and pin $c$; also in coiling about the shank a small wire spring, $d$, being made fast to the shank near the lower end. The lower end proper of said spring is carried back and forms a hook, $e$, for the reception of the pin.

The spring extends up around the shank until it reaches a point where the end of the hook $a$ terminates and rests against it. The end of the spring-wire is then bent over against the end of the hook $a$, and runs down by the side of the coil through the hook $e$, and ends with a ring, $f$, or some equivalent device.

The objects of this spring are, first, to press up against the end of the hook $a$ and prevent any articles placed on the hook from coming off by accident. A watch-key or other article is put on the hook $a$ by pressing it over the end, when the coil is contracted or pressed down, and lets the key pass on the hook. When desirable to remove the key it is done by taking hold of the ring $f$ and pulling down; then the space between the end of the hook $a$ and the shank is large enough to admit the key to be slipped out. A second object or use of the spring-wire is, as has been seen, to pass the end back to form the hook $e$ for the pin $c$.

I am aware that Mr. Merrit had a patent granted October 16, 1866, No. 58,867, for a pin for holding eyeglasses; but, I think, it will be found that I am not in conflict with him in any way.

I do not claim the fact of making a pin—hook, shank, and pin—of one piece of metal; neither could Merrit claim that, as it was an old device; he claims the spring-hook B.

My hook is not elastic, but positive; and I have a spring coiled on the shank and acting longitudinally with it—a separate piece—and therein is the novelty of my invention. The eyeglass-holder of Merrit is not a security, but the glass may be readily worked off the hook without design and lost; but in my case nothing will slip off the hook until the spring is compressed by pulling down at the ring $f$. It takes both hands to take out a key or other article from the hook, and therefore it is difficult for the "light-fingered gentry" to take anything from it. It is a simple and complete security-pin.

I claim—

As a new article of manufacture, the security-pin constructed with the spring $d$, hook $e$, and rod and ring $f$ attachment, substantially as and for the purposes specified.

J. K. MACDONALD.

Witnesses:
   HORACE HARRIS,
   BENJ. H. VAN NESS.